United States Patent [19]
Uejima et al.

[11] 4,197,391
[45] Apr. 8, 1980

[54] PHENOLIC CHELATE RESIN AND METHOD OF ADSORPTION TREATMENT

[75] Inventors: Hiroyuki Uejima, Nara; Masahide Hirai; Masahiro Kazigase, both of Kyoto, all of Japan

[73] Assignee: Unitika Ltd, Amagasaki, Japan

[21] Appl. No.: 882,307

[22] Filed: Mar. 1, 1978

[30] Foreign Application Priority Data

Mar. 1, 1977 [JP]  Japan ................................. 52-22497

[51] Int. Cl.$^2$ .......................... C08G 14/06; C08J 5/20
[52] U.S. Cl. .................................. 528/148; 210/38 B; 521/39; 529/155
[58] Field of Search .................. 260/59 R, 2.2 C, 51.1, 260/51 R; 528/148; 521/39; 210/38 B

[56] References Cited

U.S. PATENT DOCUMENTS

| | | | |
|---|---|---|---|
| 3,461,099 | 8/1969 | Muzyczko et al. | 260/59 R |
| 3,936,399 | 2/1976 | Hirai et al. | 260/51.5 |
| 4,028,284 | 6/1977 | Hirai et al. | 260/51.5 |

OTHER PUBLICATIONS

Helvetica Chimica Acta, 35, 1785-1793 (1952), Schwarzenbach et al.

*Primary Examiner*—Howard E. Schain
*Attorney, Agent, or Firm*—Sughrue, Rothwell, Mion, Zinn and Macpeak

[57] ABSTRACT

A phenolic chelate resin comprising the three-dimensional product obtained by cross-linking a phenolic compound represented by the general formula (I):

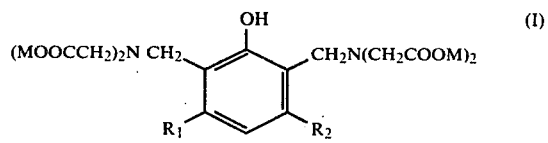

(wherein M is an alkali metal atom, an ammonium group, or a hydrogen atom, and $R_1$ and $R_2$, which may be the same or different, each is a hydrogen atom or an alkyl group having 1 to 3 carbon atoms) with a phenol and an aldehyde. The phenolic chelate resin selectively adsorbs ferric ion and/or cupric ion in an acidic aqueous solution at a pH of 3 and less.

8 Claims, No Drawings

PHENOLIC CHELATE RESIN AND METHOD OF ADSORPTION TREATMENT

BACKGROUND OF THE INVENTION

1. Field of the Invention

This invention relates to a phenolic chelate resin comprising the three-dimensional product obtained by cross-linking a specific phenolic compound with a phenol and an aldehyde. This invention further relates to a method of adsorption treatment which comprises selectively adsorbing ferric ion and/or cupric ion in an aqueous solution using such a resin.

2. Description of the Prior Art

Various studies have been made and many articles have been reported on chelate resins comprising a polymeric material with a ligand capable of forming a complex with a heavy metal ion incorporated into the polymeric material. For example, U.S. Pat. No. 3,936,399 discloses the use of a phenol-formaldehyde resin as a resin base and U.S. Pat. No. 2,910,445 discloses the use of polystyrene as a resin base. Further, examples of such resins which are now commercially available include "Dowex A-1" (tradename, produced by Dow Chemical), "Diaion CR-10 and 20" (tradename, produced by Mitsubishi Chemicals) and "Unicellex UR-10, 20 and 30" (tradenames, produced by Unitika). These resins are useful as agents for removing heavy metal ions through adsorption as well as heavy metal recovering agents. These chelate resins have been found generally effective for removing heavy metals such as copper, nickel and zinc by adsorption from an aqueous solution as well as for recovering such metals from the aqueous solution. However, all these conventional chelate resins are essentially of the iminodiacetic acid type having one iminodiacetic acid per phenyl nucleus incorporated as a ligand in the resin, and therefore, their ability to selectively adsorb and remove a plurality of heavy metal ions, particularly, ferric ion and/or cupric ion is low. Also, their ability to selectively trap heavy metal ions such as ferric ion and/or cupric ion in an aqueous solution of a low pH is low.

It is known that phenols easily form complex salts with ferric ions and that ethylenediaminetetraacetic acid (EDTA) is a good low molecular weight chelating agent. Schwarzenbach et al [*Helv. Chim. Acta.* 35, 1785 (1952)] synthesized an EDTA-analogous chelating agent, i.e., p-substituted (1-hydroxyphenylene-2,6)-bismethyl iminodiacetic acid that is in some respects similar to the phenolic compound which is used in this invention. It is difficult, however, to make a resin of this compound. Although phenolic chelate resins are not particularly novel as chelate resins, those described in prior art references, for example, U.S. Pat. No. 3,936,399 and Japanese Patent Application (OPI) No. 51,389/74 still have the defects mentioned above because the chelating groups present are of the iminodiacetic acid type described above or are of the aminocarboxylic acid type.

A variety of aqueous solutions that contain heavy metals exist. If it becomes possible to selectively adsorb ferric ions and/or cupric ions and remove them from an aqueous solution containing a plurality of heavy metal ions so as to recover them separately, the aqueous solution thus treated can be reused without any special treatment. However, conventional chelate resins do not have a high selective adsorbability for ferric ions and/or cupric ions, nor do they have high selective adsorbability for these ions in an acidic aqueous solution at a pH of about 3 or less.

SUMMARY OF THE INVENTION

Therefore one object of this invention is to provide a phenolic chelate resin which has a high selective adsorbability for ferric ions and/or cupric ions and which can be regenerated for repeated use.

Another object of this invention is to provide a method of adsorption treatment which uses this phenolic chelate resin to selectively adsorb ferric ions and/or cupric ions in an acid aqueous solution at a pH of about 3 or less, to thereby remove these ions from the solution.

As a result of extensive research for achieving these objects, it has now been found that by introducing as side chains of a phenol-aldehyde resin matrix a phenolic compound which has two iminodiacetic acid groups present therein, a chelate resin which has a high selective adsorbability for ferric ions and/or cupric ions within a low pH range can be prepared.

Accordingly, this invention in one embodiment provides a phenolic chelate resin comprising the three-dimensional product obtained by cross-linking a phenolic compound represented by the general formula (I):

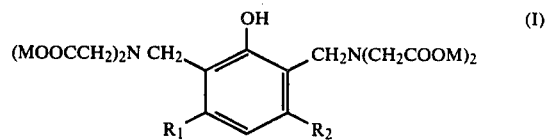

wherein M is an alkali metal atom, an ammonium group or a hydrogen atom, and $R_1$ and $R_2$, which may be the same or different, each is a hydrogen atom or an alkyl group having 1 to 3 carbon atoms, with a phenol and an aldehyde.

In another embodiment, this invention provides a method of adsorption treatment comprising selectively adsorbing ferric ions and/or cupric ions from an aqueous solution using the phenolic chelate resin described above.

DETAILED DESCRIPTION OF THE INVENTION

The phenolic chelate resin of this invention exhibits an improved effect in trapping special heavy metal ions, particularly, ferric ions and cupric ions. The phenolic chelate resin of this invention also is commercially advantageous since the resin can be repeatedly regenerated by acid treatment and reused.

Suitable examples of alkali metal atoms for M in the general formula (I) described above include sodium, potassium and lithium atoms.

Examples of suitable phenolic compounds represented by the general formula (I) that can be employed in this invention are (1-hydroxyphenylene-2,6)-bis-methyl iminodiacetic acid, (1-hydroxy-3-methylphenylene-2,6)-bis-methyl iminodiacetic acid, (1-hydroxy-3,5-dimethylphenylene-2,6)-bis-methyl iminodiacetic acid, (1-hydroxy-3-ethylphenylene-2,6)-bis-methyl iminodiacetic acid and (1-hydroxy-3-propylphenylene-2,6)-bis-methyl iminodiacetic acid. (1-Hydroxyphenylene-2,6)-bis-methyl iminodiacetic acid is particularly preferred. These phenol compounds can be synthesized from iminodiacetic acid, phenol and formaldehyde in accordance with the method described in *Helv. Chim. Acta.*

35, 1785 (1952). Iminodiacetic acid can be synthesized from inexpensive starting materials such as ammonia, hydrogen cyanide, formaldehyde, etc. The iminodiacetic acid is chemically very stable as compared with other chelating agents because, like industrially produced low molecular weight chelating agents such as ethylene diaminetetraacetic acid and nitrilotriacetic acid, low molecular weight chelating agents such as ethylenediaminetetraacetic acid and nitrilotriacetic acid have the moiety

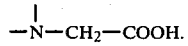

The phenolic chelate resin of this invention is prepared by subjecting a phenolic compound of the general formula (I), such as (1-hydroxyphenylene-2,6)-bis-methyl iminodiacetic acid, to a condensation reaction with a phenol and an aldehyde in a molar ratio so adjusted that a resole-type resin or a novolak-type resin is desired.

Typical examples of known phenolic resins are resole resins that require only heat treatment for curing (see, for example, U.S. Pat. No. 3,650,102) and novolak resins that require addition, for example, of an aldehyde before heating for curing (see, for example, U.S. Pat. No. 2,190,672). According to this invention, a resole-type phenolic chelate resin or a novolak-type phenolic chelate resin can be produced by changing the molar ratio of the aldehyde to the phenol (hereinafter, this ratio for simplicity will be referred to as the "A/P" ratio).

That is, in order to obtain a resole-type phenolic chelate resin which requires only heat treatment for curing, the A/P ratio is in the range of about 1.1:1 to 1.5:1 whereas for obtaining a novolak-type phenolic chelate resin which requires a cross-linking treatment in addition to a heat treatment, the A/P ratio is in the range of about 0.7:1 to less than 1.1:1. Therefore, the A/P ratio as used herein and the A/P ratio as one of the conditions for producing conventional phenolic resins have the same meaning. In producing the phenolic chelate resin of this invention from a phenol, an aldehyde and a phenolic compound represented by the general formula (I), the phenolic compound represented by the general formula (I) may be considered as if it were a phenol.

An example of the process for producing the phenolic chelate resin of this invention from a phenol, an aldehyde and a phenolic compound represented by the general formula (I) of which (1-hydroxyphenylene-2,6)-bis-methyl iminodiacetic acid is a typical example is described below. In the first step, a phenolic compound represented by the general formula (I) is reacted with an aldehyde in a molar ratio of the aldehyde to the phenolic compound represented by the general formula (I) ranging from about 0.2:1 to 2.0:1, preferably from 0.6:1 to 1.2:1, by heating under stirring at about 20° to 90° C. for about 1 to 6 hours, preferably at 50°-80° C. for 2 to 4 hours. In the second step, a phenol is reacted with the reaction product of the first step in a molar ratio of the phenol to the phenolic compound represented by the general formula (I) ranging from about 0.5:1 to 9.0:1, preferably from 0.8:1 to 2.5:1, by heating under agitation at about 20° to 95° C. for about 1 to 6 hours, preferably at 50° to 90° C. for 2 to 4 hours; an aldehyde is further reacted with the reaction product of the second step in a molar ratio of the aldehyde to the phenolic compound represented by the general formula (I) ranging from about 1.0:1 to 6.0:1, preferably from 3.0:1 to 5.0:1, and then a suspension polycondensation reaction is performed in the presence of a solvent at about 90° to about 150° C. for about 1 to about 7 hours, preferably at about 110° to about 130° C. for about 2 to about 5 hours. Suitable solvents which can be used in the suspension polycondensation are, for example, halogenated aliphatic hydrocarbons (e.g., carbon tetrachloride, chloroform, trichloroethylene, perchloroethylene, chloral, dichloroethylene, dichloroethane, 1,2-dichloropropane, etc.), halogenated aromatic hydrocarbons (e.g., chlorobenzene, o-dichlorobenzene, p-dichlorobenzene, bromobenzene, etc.), aromatic hydrocarbons (e.g., benzene, toluene, etc.), cycloalkanes (e.g., cyclohexane, cyclopropane, etc.), cyclic alcohols (e.g., cyclohexanol, cyclopentanol, etc.), etc. A suitable amount of the reactants is about 0.5 to about 2 times by volume to the volume of the solvent used. To make the composition of the final chelate resin as homogeneous as possible, the suspension polycondensation reaction is preferably carried out at a controlled temperature of about 20° to about 90° C., followed by gradually increasing the temperature. At the final stage, the reaction proceeds under reflux conditions while the temperature is maintained at about 90° to 150° C. for about 1 to 7 hours, preferably at about 110° to 130° C. for about 2 to 5 hours, and when a desired degree of condensation is obtained, water is removed from the reaction product with heat under a reduced (e.g., 0.1 to 750 mm Hg) or normal pressure to obtain a viscous resinous composition.

Of the phenolic compounds represented by the general formula (I) used in this invention, those wherein M in the general formula (I) is an alkali metal atom or an ammonium group are highly soluble and reactive. It is therefore desired that the polycondensation reaction for producing the phenolic chelate resin of this invention be carried out after a phenolic compound represented by the general formula (I), for instance, (1-hydroxyphenylene-2,6)-bis-methyl iminodiacetic acid, is treated with an alkali metal hydroxide such as sodium hydroxide or potassium hydroxide to convert the acetic acid moiety to the alkali metal salt form. The concentration of the sodium hydroxide or potassium hydroxide can be about 5 to 100% by weight, preferably 10 to 80% by weight, and particularly a concentration of 20 to 50% by weight is preferred. The molar ratio of the sodium or potassium hydroxide to (1-hydroxyphenylene-2,6)-bis-methyl iminodiacetic acid can range from about 1.0:1 to 6.0:1, preferably from 2.0:1 to 5.0:1.

The ratio of mixing the phenolic compound represented by the general formula (I) with the phenol is critical to the chelating effect and durability of the phenolic chelate resin obtained. If the molar ratio of the phenolic compound represented by the general formula (I) to the total amount of the phenol and the phenolic compound represented by the general formula (I) is less than about 0.1:1, a sufficient chelating effect is not obtained. If the ratio is more than about 0.6:1, cross-linking does not proceed sufficiently to produce a desired three-dimensional resin which can be sufficiently practically used. It is therefore preferred for the ratio to be in the range of from about 0.1:1 to 0.6:1, with a particularly preferred range being from 0.3:1 to 0.5:1.

Examples of suitable phenols which can be used in this invention include mono-, di- and trihydric phenols and naphthols in which the aryl moiety may be substituted with 1 or 2 alkyl groups having 1 to 3 carbon atoms therein. Specific examples of suitable phenols which can be used include phenol; alkyl-substituted monohydric phenols such as o-cresol, m-cresol, p-cresol, 2,3-xylenol, 2,5-xylenol, 3,5-xylenol, α-naphthol, β-naphthol, o-ethylphenol, m-ethylphenol, p-ethylphenol, etc.; dihydric phenols such as catechol, resorcinol, bisphenol A, etc.; trihydric phenols such as pyrogallol, phloroglucinol, etc.; and the like. These phenols can be used individually or as a mixture thereof. Preferred phenols are phenol, bisphenol A, o-cresol, m-cresol, p-cresol, 3,5-xylenol and resorcinol, and phenol, bisphenol A, m-cresol and resorcinol are especially preferred.

Examples of suitable aldehydes or aldehyde precursors which can be used in this invention include aliphatic saturated aldehydes such as formaldehydes, acetaldehyde, propionaldehyde, etc.; aromatic aldehydes such as benzaldehyde, salicylaldehyde, etc.; heterocyclic aldehydes such as furfural, etc.; formaldehyde derivatives such as paraformaldehyde, hexamethylenetetramine, etc.; and the like. The aldehydes can also be used individually or as a mixture thereof. Preferred aldehydes or precursors thereof are formaldehyde, paraformaldehyde and hexamethylenetetramine.

A reaction promotor can be used in performing steps 1 to 3 described above and in the polycondensation reaction if desired. Examples of suitable reaction promotors include mineral acids such as hydrochloric acid, sulfuric acid, etc., organic acids such as formic acid, oxalic acid, etc., aromatic sulfonic acids such as benzenesulfonic acid etc., metal hydroxides such as sodium hydroxide, potassium hydroxide, etc., ammonia, amines such as trimethylamine, triethylamine, etc., and nitrogen-containing basic compounds of which pyridine is a typical example. The reaction promotors can be used individually or as a mixture thereof. Where an acid is used as a reaction promotor, a suitable amount is about 1.5 to about 3 moles per mole of the phenolic compound represented by the general formula (I) and where an alkali metal hydroxide is used as a reaction promotor, a suitable amount is about 3 to about 6 moles per mole of the phenolic compound represented by the general formula (I). For producing a phenolic chelate resin having a high exchange capacity and selectivity for ferric ions and cupric ions, alkaline catalysts are most preferred.

Of examples of the phenolic chelate resin of this invention, the novolak-type chelate resin is thermoplastic and has a wide range of applications because its thermoplastic property allows the resin to be processed into various forms, which can then be cured by cross-linking. If the cross-linking reaction is carried out by immersing the chelate resin composition in an aqueous aldehyde solution to increase the rate of the reaction, it is preferred for either an acid such as hydrochloric acid, oxalic acid, etc. to be added as a reaction promotor catalyst or the reaction system to be heated at a temperature in the range of from room temperature (e.g., about 20°–30° C.) to about 90° C., preferably from 40° to 90° C. The amount of the acid catalyst to be used will vary depending on the type of acid and aldehyde employed. The novolak-type chelate resin of this invention can also be pulverized and mixed with a cross-linking agent such as hexamethylenetetramine to prepare a shaping material, which can then be heated to about 40° to 90° C. for cross-linking.

Of the examples of the phenolic chelate resin of this invention, the resole-type chelate resin can be readily cured into a desired shape by dissolving the resin in water or organic solvents such as isopropyl alcohol, n-butyl alcohol, etc., molding or fabricating the solution into the desired shape, and heating the molded or fabricated composition to a temperature in the range of from about room temperature to about 90° C., preferably from 40° to 90° C. or, if more difficult to cure, heated to about 100° to about 150° C. The resin can also be subjected to a simultaneous granulation and cross-linking in a solvent in which it is soluble so as to produce a granular chelate resin, and the resulting resin has exactly the same uses as that of conventional granular chelate resins. One particular advantage of the phenolic chelate resin of this invention is its good moldability or fabricating properties.

The phenolic chelate resin of this invention can be contacted, e.g., at a temperature of from about 5° to about 80° C., preferably from about 20° to about 60° C., with the solution from which the heavy metal ions are removed by simply mixing the phenolic chelate resin of the invention therewith or the phenolic chelate resin can be placed in a column and the heavy metal ion solution passed therethrough, the latter technique generally being employed.

The contact time of the phenolic chelate resin of this invention with the heavy metal ion solution will vary depending on the amount of the phenolic chelate resin of this invention used, the composition of the heavy metal ion solution to be treated, the rate of passing the heavy metal ion solution through the column and the like, but the contact time generally ranges from about 5 min. to about 100 hours, preferably from about 30 min. to about 50 hours for 100 g of the resin.

The selective adsorption for heavy metal ions of the phenolic chelate resin of this invention will vary according to factors such as the pH and temperature of the aqueous solution that contains heavy metal ions as well as the kind and concentration of other ions present together with the heavy metal ions. However, it has been confirmed that the order of selectivity is, in general, in order of increasing selectivity, from sodium, barium, magnesium, calcium, manganese, cobalt, zinc, aluminum, nickel, to iron (III) and copper (II). More specifically, the chelate resin of this invention has the highest selectivity for iron (III) and copper (II), and especially, the chelate resin of this invention exhibits an extremely high adsorption for ferric ions and/or cupric ions in an aqueous solution at a pH of 0 to about 3 as compared with other metal ions. For instance, as an example, for an aqueous solution that contains three kinds of metal ions, i.e., calcium ion, zinc ion and ferric ion, at the same concentration and whose pH has been adjusted at room temperature to 2.0 with 3 to 10% by weight hydrochloric acid by using a pH meter with a glass electrode as a reference, if this solution is treated with the phenolic chelate resin of this invention, the resin exhibits high selectivity for ferric ions such that the concentration of calcium and zinc ions remains substantially constant while only the ferric ions are selectively adsorbed. In addition, the high adsorbability and the selectivity for these heavy metal ions are exhibited equally by the novolak-type as well as the resole-type phenolic chelate resin of this invention.

The adsorbability of heavy metal ions of the phenolic chelate resin of this invention will vary according to the conditions for preparing the same, but in general, about 0.5 to about 1.0 equivalent of heavy metal ion per equivalent of (1-hydroxyphenylene-2,6)-bis-methyl iminodiacetic acid used forms a chelate.

A hydroxide which is partially soluble is formed in an aqueous solution that contains ferric ions and/or cupric ions, iron ions and/or copper ions but at a pH of about 3 and less, almost all of the iron and/or copper present is ionized. It is therefore desirable for an aqueous solution from which ferric ions and/or cupric ions are to be removed through adsorption on a chelate resin to be acidic having a pH of about 3 and less, but a conventional chelate resin is almost invariably used at a pH in the range of from about 2 to about 10, preferably from 3 to 9, since the adsorbability for heavy metals of conventional chelate resins drops at a pH of about 3 and less, particularly under strongly acidic conditions of a pH of 2 or less. In contrast, the phenolic chelate resin according to this invention exhibits a high selective adsorbability for ferric ions and/or cupric ions at such a low pH of 0 to about 3, particularly 0 to 2, and so, not only is the chelate resin of this invention capable of removing, through adsorption, ferric ions and/or cupric ions from strongly acidic aqueous solutions but also the chelate resin of this invention is capable of selectively adsorbing ferric ions and/or cupric ions from an aqueous solution that contains a plurality of heavy metals by making the solution strongly acidic with a pH of 2 or less.

For instance, when an aqueous solution that contains 100 ppm of ferric ions and 81800 ppm of zinc ions and whose pH has been adjusted to 2.0 is passed at a rate of 50 ml per hour through a column (inner diameter: 9 mm) packed with 25 ml of the phenolic chelate resin of this invention, the zinc ions immediately pass from the column but almost all ferric ions are adsorbed by the chelate resin.

When the phenolic chelate resin of this invention adsorbs ferric ions and/or cupric ions until its adsorbability is saturated, the ferric ions and/or cupric ions can easily be desorbed from the resin by treating the chelate resin of this invention with an aqueous solution of a mineral acid, such as hydrochloric acid or sulfuric acid, of a concentration of about 10 to 30% by weight and the ions elute into the aqueous mineral acid solution. In the regeneration, the time required for regeneration will vary depending upon the amount of resin to be regenerated, but is generally from about 5 sec. to about 120 min., preferably from about 5 min. to about 60 min. for 100 g of the resin treated with 16 wt.% sulfuric acid. A suitable temperature which can be used in the regeneration generally ranges from about 5° to about 40° C., preferably from about 15° to about 30° C. The chelate resin from which the ferric ions and/or cupric ions have been removed by desorption can be used again without any further treatment, but preferably, the chelate resin is either treated with an aqueous solution of an alkali hydroxide such as sodium hydroxide or calcium hydroxide or washed with water before it is reused. No decrease in adsorbability and selectivity for ferric ions and/or cupric ions is observed if the chelate resin of this invention is used after regeneration in this manner.

The method according to this invention of adsorption treatment is very effective for removing ferric ions from a zinc-rich aqueous solution. It is also effective for removal of cupric ions from a nickel-rich aqueous solution, ferric ions from aluminum sulfate, and cupric ions from copper pyrophosphate.

As described above, the phenolic chelate resin of this invention can be prepared using a simple process and exhibits a remarkable effect in trapping specific heavy metals, particularly iron (III) and copper (II). In addition, it is a practical chelate resin that can be repeatedly used any number of times by simply regenerating the chelate resin with an acid. It is therefore a novel phenolic chelate resin that has a utility different from that of conventional resins.

This invention will now be described in more detail by reference to the following examples. Unless otherwise stated, all percentages, parts, ratios and the like are by weight.

EXAMPLE 1

A homogeneous aqueous solution was prepared by adding dropwise 227.3 parts of a 22% aqueous solution of sodium hydroxide to 96 parts of (1-hydroxyphenylene-2,6)-bis-methyl iminodiacetic acid with cooling to 50° C. The solution was mixed with 20.3 parts of a 37% aqueous solution of formaldehyde and reacted at a controlled temperature of 65°–70° C. for 3 hours. After the reaction, the reaction system was cooled to 30° C. and mixed with 23.5 parts of phenol under stirring, and the reaction was continued at 85°–90° C. for 4 hours. The reaction product was cooled to 30° C. and mixed with 80.5 parts of a 37% aqueous solution of formaldehyde to perform a suspension polycondensation which produced 175 parts of cured resin. After washing with water, the resin was neutralized with a 22% aqueous solution of hydrochloric acid to obtain an orange yellow resin.

When the resin was added to an aqueous solution containing ferric ions that had been adjusted to have a pH of 2.0 and the mixture was shaken, the amount of ferric ions adsorbed on the resin was 1.5 milliequivalents per gram of the resin. The ferric ions were easily desorbed from the resin by treating the resin with a 22% aqueous solution of hydrochloric acid, and no substantial decrease was observed in the adsorbing effect of the resin. Substantially the same adsorbability was exhibited by the resin when determined in an aqueous solution that contained ferric ions at a pH of 4.0.

EXAMPLE 2

A homogeneous aqueous solution was prepared by adding dropwise 227.3 parts of a 22% aqueous solution of sodium hydroxide to 96 parts of (1-hydroxyphenylene-2,6)-bis-methyl iminodiacetic acid with cooling to 50° C. The solution was mixed with 20.3 parts of a 37% aqueous solution of formaldehyde and reacted at a controlled temperature of 65°–70° C. for 3 hours. After the reaction, the reaction system was cooled to 30° C. and mixed with 27.5 parts of resorcinol under stirring, and the reaction was continued at 25°–50° C. for 2 hours. The reaction product obtained was cooled to 30° C. and mixed with 80.5 parts of a 37% aqueous solution of formaldehyde to perform a suspension polycondensation which produced 160 parts of cured resin. The resin was subjected to the same treatment and absorption testing as in Example 1. The amount of ferric ions adsorbed on the thus treated resin was 1.2 milliequivalents per gram of the resin.

When an aqueous solution having a pH of 1.5 and containing calcium ions, zinc ions and ferric ions in equal amounts was passed through a column packed with this resin, almost all of the ferric ions were adsorbed by the resin but virtually all of the calcium ion and zinc ion passed from the column.

EXAMPLE 3

A mixture of 96 parts of (1-hydroxyphenylene-2,6)-bis-methyl iminodiacetic acid, 227.3 parts of a 22% aqueous solution of sodium hydroxide and 20.3 parts of a 37% aqueous solution of formaldehyde was subjected to a reaction at a controlled temperature of 65°–70° C. for 3 hours. After adding 23.5 parts of phenol to the mixture, the reaction was further continued at 85°–90° C. for 4 hours. The reaction product obtained was mixed with 80.5 parts of a 37% aqueous solution of formaldehyde to effect a suspension polycondensation which produced 170 parts of cured resin. The resin was subjected to the same treatment and adsorption testing as in Example 1. The amount of ferric ions adsorbed on the thus treated resin was 1.7 milliequivalents per gram of the resin.

When an aqueous solution having a pH of 1.5 and containing 500 ppm each of aluminum ions and ferric ions was passed through a column packed with this resin, almost all of the ferric ions were adsorbed on the column but substantially all of the aluminum ion passed from the column.

EXAMPLE 4

A mixture of 96 parts of (1-hydroxyphenylene-2,6)-bis-methyl iminodiacetic acid, 227.3 parts of a 22% aqueous solution of sodium hydroxide and 20.3 parts of a 37% aqueous solution of formaldehyde was subjected to a reaction at a controlled temperature of 65°–70° C. for 3 hours. After adding 15 parts of resorcinol to the mixture, the reaction was further continued for 2 hours at 25°–50° C. After completion of the reaction, the reaction mixture was neutralized to a pH of 7 with hydrochloric acid (4 wt.%) and water removed by heating at 100°–110° C. The resin obtained was pulverized, immersed overnight in a 1:1 mixture (by volume) of a 35% aqueous solution of hydrochloric acid and a 37% aqueous solution of formaldehyde, heated for mixing at 90° C. for 2 hours, and then heated to dry the resin at 120° C. for 2 hours.

The resin thus obtained was subjected to the same treatment and adsorption testing as in Example 1. The amount of ferric ions adsorbed on the resin was 1.1 milliequivalents per gram of the resin.

EXAMPLE 5

A homogeneous aqueous solution was prepared by adding dropwise 227.3 parts of a 22% aqueous solution of sodium hydroxide to 96 parts of (1-hydroxyphenylene-2,6)-bis-methyl iminodiacetic acid with cooling to 50° C. The solution was mixed with 16.4 parts of 92% paraformaldehyde and reacted at a controlled temperature of 65°–70° C. for 3 hours. After the reaction, the reaction system was cooled to 30° C. and mixed with 47 parts of phenol under stirring, and the reaction was continued for 4 hours at 85°–90° C. The reaction product was mixed with 75.2 parts of a 92% aqueous solution of paraformaldehyde to effect a suspension polycondensation which produced 250 parts of cured resin. The resin was subjected to the same treatment and adsorption testing as in Example 1. The amount of ferric ions adsorbed on the thus-treated resin was 0.8 milliequivalent per gram of the resin.

EXAMPLE 6

A mixture of 96 parts of (1-hydroxyphenylene-2,6)-bis-methyl iminodiacetic acid, 25 parts of 95% sulfuric acid and 20.3 parts of a 37% aqueous solution of formaldehyde was subjected to a reaction at a controlled temperature of 65°–70° C. for 5 hours. After adding 23.5 parts of phenol to the mixture, the reaction was further continued for 4 hours at 85°–90° C. The reaction product obtained was mixed with 80.5 parts of a 37% aqueous solution of formaldehyde to perform a suspension polycondensation which produced 150 parts of cured resin.

The resin was subjected to the same treatment and adsorption testing as in Example 1. The amount of ferric ions adsorbed on the thus treated resin was 1.3 milliequivalents per gram of the resin.

EXAMPLE 7

A solution was prepared by adding dropwise 227.3 parts of a 22% aqueous solution of sodium hydroxide to 96 parts of (1-hydroxyphenylene-2,6)-bis-methyl iminodiacetic acid with cooling to 50° C. The solution was mixed with 20.3 parts of a 37% aqueous solution of formaldehyde and reacted at a controlled temperature of 65°–70° C. for 3 hours. After the reaction, the reaction system was cooled to 30° C. and mixed with 27 parts of m-cresol, and the reaction was further continued for 5 hours at a controlled temperature of 85°–90° C. After the reaction, 80.5 parts of a 37% aqueous solution of formaldehyde was further added to the mixture and the mixture was stirred at room temperature for 30 minutes. The reaction product was subjected to a suspension polycondensation which produced 155 parts of resin.

The resin was subjected to the same treatment and adsorption testing as in Example 1. The amount of ferric ions adsorbed on the thus treated resin was 1.25 milliequivalents per gram of the resin.

EXAMPLE 8

When the orange yellow resin obtained in Example 1 was added to an aqueous solution containing cupric ions that had been adjusted to a pH of 2.0 and the mixture was shaken, the amount of cupric ions adsorbed on the resin was 1.6 milliequivalents per gram of the resin.

When an aqueous solution containing equal amounts of magnesium ions, nickel ions and cupric ions was passed through a column packed with this resin, almost all of the cupric ion was adsorbed on the column but substantially all of the magnesium ion and nickel ion passed from the column.

EXAMPLE 9

Suspension polycondensation was conducted in the same manner as described in Example 1 except using 100 parts of (1-hydroxy-3-methylphenylene-2,6)-bis-methyl iminodiacetic acid in place of 96 parts of (1-hydroxyphenylene-2,6)-bis-methyl iminodiacetic acid to obtain 179 parts of cured resin.

The resin thus obtained was subjected to the same treatment and adsorption testing as described in Example 1. The amount of ferric ions adsorbed on the resin was 1.1 milliequivalents per gram of the resin.

EXAMPLE 10

Suspension polymerization was conducted in the same manner as described in Example 1 except using 103 parts of (1-hydroxy-3,5-dimethylphenylene-2,6)-bis-methyl iminodiacetic acid in place of 96 parts of (1-hydroxyphenylene-2,6)-bis-methyl iminodiacetic acid to obtain 182 parts of cured resin.

The resin thus obtained was subjected to the same treatment and adsorption testing as described in Example 1. The amount of ferric ions adsorbed on the resin was 1.0 milliequivalent per gram of the resin.

When an aqueous solution having a pH of 2.0 and containing calcium ions, zinc ions and ferric ions in equal amounts by weight was passed through a column packed with this resin, almost all of the ferric ions were adsorbed by the resin and almost all of the calcium ion and zinc ion passed from the column.

While the invention has been described in detail and with reference to specific embodiments thereof, it will be apparent to one skilled in the art that various changes and modifications can be made therein without departing from the spirit and scope thereof.

What is claimed is:

1. A three-dimensional phenolic chelate resin comprising the cross-linked reaction product of (a) a phenolic compound represented by the general formula (I)

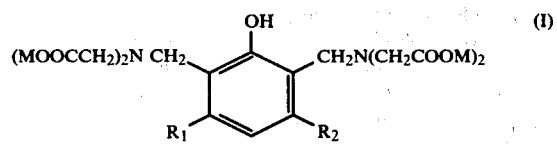

wherein M is an alkali metal atom, an ammonium group or a hydrogen atom; $R_1$ and $R_2$, which may be the same or different, each is a hydrogen atom or an alkyl group having 1 to 3 carbon atoms, with (b) a phenol and (c) an aldehyde or an aldehyde precursor.

2. The phenolic chelate resin according to claim 1, wherein M is an alkali metal atom.

3. The phenolic chelate resin according to claim 1, wherein the phenolic compound (a) is (1-hydroxyphenylene-2,6)-bis-methyl iminodiacetic acid.

4. The phenolic chelate resin according to claim 1, wherein the phenol (b) is selected from the group consisting of phenol, bisphenol A, o-cresol, m-cresol, p-cresol, 3,5-xylenol and resorcinol.

5. The phenolic chelate resin according to claim 1, wherein the aldehyde or aldehyde precursor (c) is selected from the group consisting of formaldehyde, paraformaldehyde and hexamethylenetetramine.

6. The phenolic chelate resin according to claim 1, wherein the molar ratio of the phenolic compound (a) to the total amount of the phenolic compound (a) and the phenol (b) is in the range of from about 0.1:1 to 0.6:1.

7. The phenolic chelate resin according to claim 1, wherein the phenolic chelate resin is a granular resin.

8. The phenolic chelate resin according to claim 1, wherein the phenolic chelate resin retains a substantially constant adsorbability for ferric ion and/or cupric ion within a pH range of from 0 to 2.

* * * * *